US007840614B2

(12) United States Patent
Owen et al.

(10) Patent No.: US 7,840,614 B2
(45) Date of Patent: Nov. 23, 2010

(54) VIRTUAL CONTENT REPOSITORY APPLICATION PROGRAM INTERFACE

(75) Inventors: James Owen, Golden, CO (US); Joseph Conti, Boulder, CO (US); Chang Choe, Boulder, CO (US); Jalpesh Patadia, Boulder, CO (US); Gregory Smith, Westminster, CO (US)

(73) Assignee: Bea Systems, Inc., Redwood Shores, CA (US)

( * ) Notice: Subject to any disclaimer, the term of this patent is extended or adjusted under 35 U.S.C. 154(b) by 996 days.

(21) Appl. No.: 10/618,494

(22) Filed: Jul. 11, 2003

(65) Prior Publication Data

US 2004/0167867 A1      Aug. 26, 2004

Related U.S. Application Data

(60) Provisional application No. 60/449,154, filed on Feb. 20, 2003, provisional application No. 60/451,174, filed on Feb. 28, 2003.

(51) Int. Cl.
*G06F 12/00* (2006.01)
*G06F 17/30* (2006.01)

(52) U.S. Cl. .................. 707/821; 707/831; 707/828

(58) Field of Classification Search .................. 709/203
See application file for complete search history.

(56) References Cited

U.S. PATENT DOCUMENTS

| | | | |
|---|---|---|---|
| 4,853,843 A | 8/1989 | Ecklund | |
| 5,047,918 A | 9/1991 | Schwartz et al. | |
| 5,173,919 A | 12/1992 | Schmidl et al. | |
| 5,173,939 A | 12/1992 | Adbdi et al. | .................. 380/25 |
| 5,237,614 A | 8/1993 | Weiss | |
| 5,335,345 A | 8/1994 | Frieder et al. | |
| 5,347,653 A | 9/1994 | Flynn et al. | |
| 5,355,474 A | 10/1994 | Thuraisingham et al. | |
| 5,369,702 A | 11/1994 | Shanton | ....................... 713/166 |
| 5,426,747 A | 6/1995 | Weinreb et al. | |
| 5,475,834 A | 12/1995 | Anglin et al. | |
| 5,481,700 A | 1/1996 | Thuraisingham | ............ 395/600 |
| 5,544,322 A | 8/1996 | Cheng et al. | |

(Continued)

FOREIGN PATENT DOCUMENTS

EP     1 256 889     11/2002

(Continued)

OTHER PUBLICATIONS

"USDataCenter Chooses Baltimore SelectAccess to Enable Next generation Security Solutions for eBusiness"; BusinessWire, P2079, Apr. 4, 2001; Newswire; Trade; pp. 2.

(Continued)

*Primary Examiner*—Tony Mahmoudi
*Assistant Examiner*—Paul Kim
(74) *Attorney, Agent, or Firm*—Fliesler Meyer LLP

(57) ABSTRACT

An application program interface (API) embodied on one or more computer readable media, comprising a first group of services related to integrating content repositories into virtual content repositories (VCRs), a second group of services related to manipulating information in VCRs, a third group of services related to searching VCRs, a forth group of services related to configuring VCRs, and wherein the application program interface is compatible with a content repository service provider interface (SPI).

25 Claims, 10 Drawing Sheets

U.S. PATENT DOCUMENTS

| | | | |
|---|---|---|---|
| 5,557,747 A | 9/1996 | Rogers et al. | |
| 5,574,898 A | 11/1996 | Leblang et al. | |
| 5,627,886 A | 5/1997 | Bowman | |
| 5,757,669 A | 5/1998 | Christie et al. | |
| 5,797,128 A | 8/1998 | Birnbaum | 707/5 |
| 5,806,066 A | 9/1998 | Golshani | |
| 5,806,078 A | 9/1998 | Hug et al. | |
| 5,813,009 A | 9/1998 | Johnson et al. | |
| 5,825,883 A | 10/1998 | Archibald et al. | |
| 5,826,000 A | 10/1998 | Hamilton | |
| 5,826,268 A | 10/1998 | Schaefer et al. | 707/9 |
| 5,848,396 A | 12/1998 | Gerace | 705/10 |
| 5,867,667 A | 2/1999 | Butman et al. | |
| 5,872,928 A | 2/1999 | Lewis et al. | |
| 5,889,953 A | 3/1999 | Thebaut et al. | |
| 5,918,210 A | 6/1999 | Rosenthal et al. | |
| 5,950,195 A | 9/1999 | Stockwell et al. | |
| 5,954,798 A | 9/1999 | Shelton et al. | |
| 5,956,400 A | 9/1999 | Chaum et al. | |
| 5,966,707 A | 10/1999 | Van Huben et al. | |
| 5,987,469 A | 11/1999 | Lewis et al. | |
| 5,987,611 A | 11/1999 | Freund | |
| 5,991,877 A | 11/1999 | Luckenbaugh | 713/200 |
| 6,005,571 A | 12/1999 | Pachauri | 345/339 |
| 6,006,194 A | 12/1999 | Merel | |
| 6,029,144 A | 2/2000 | Barrett et al. | |
| 6,029,182 A | 2/2000 | Nehab et al. | 715/523 |
| 6,054,910 A | 4/2000 | Tada et al. | |
| 6,055,515 A | 4/2000 | Consentino et al. | |
| 6,055,637 A | 4/2000 | Hudson et al. | |
| 6,058,392 A | 5/2000 | Sampson et al. | |
| 6,073,242 A | 6/2000 | Hardy et al. | |
| 6,083,276 A | 7/2000 | Davidson et al. | 717/1 |
| 6,098,173 A | 8/2000 | Elgressy et al. | |
| 6,105,035 A | 8/2000 | Monge et al. | |
| 6,108,687 A | 8/2000 | Craig | |
| 6,112,024 A | 8/2000 | Almond et al. | |
| 6,122,647 A | 9/2000 | Horowitz et al. | |
| 6,141,010 A | 10/2000 | Hoyle | 715/854 |
| 6,141,686 A | 10/2000 | Jackowski et al. | |
| 6,148,333 A | 11/2000 | Guedalia et al. | |
| 6,154,844 A | 11/2000 | Touboul et al. | |
| 6,157,924 A | 12/2000 | Austin | 707/10 |
| 6,158,010 A | 12/2000 | Moriconi et al. | |
| 6,167,407 A | 12/2000 | Nachenberg et al. | |
| 6,167,445 A | 12/2000 | Gai et al. | |
| 6,170,009 B1 | 1/2001 | Mandal et al. | |
| 6,182,226 B1 | 1/2001 | Reid et al. | 713/201 |
| 6,182,277 B1 | 1/2001 | Degroot et al. | |
| 6,185,587 B1 | 2/2001 | Bernardo et al. | |
| 6,202,066 B1 | 3/2001 | Barkley et al. | |
| 6,202,157 B1 | 3/2001 | Brownlie et al. | |
| 6,202,207 B1 | 3/2001 | Donohoe | |
| 6,209,101 B1 | 3/2001 | Mitchem et al. | |
| 6,216,134 B1 | 4/2001 | Heckerman et al. | |
| 6,216,231 B1 | 4/2001 | Stubblebine | |
| 6,226,745 B1 | 5/2001 | Wiederhold | 713/200 |
| 6,241,608 B1 | 6/2001 | Torango | 463/27 |
| 6,243,747 B1 | 6/2001 | Lewis et al. | |
| 6,253,321 B1 | 6/2001 | Nikander et al. | |
| 6,256,031 B1 | 7/2001 | Meijer et al. | |
| 6,260,050 B1 | 7/2001 | Yost et al. | 715/501.1 |
| 6,269,393 B1 | 7/2001 | Yost et al. | 709/201 |
| 6,269,456 B1 | 7/2001 | Hodges et al. | |
| 6,275,941 B1 | 8/2001 | Saito et al. | |
| 6,285,366 B1 | 9/2001 | Ng et al. | |
| 6,285,985 B1 | 9/2001 | Horstmann | 705/14 |
| 6,292,900 B1 | 9/2001 | Ngo et al. | |
| 6,295,607 B1 | 9/2001 | Johnson | |
| 6,301,613 B1 | 10/2001 | Ahlstrom et al. | |
| 6,308,163 B1 | 10/2001 | Du et al. | 705/8 |
| 6,317,868 B1 | 11/2001 | Grimm et al. | |
| 6,327,594 B1 | 12/2001 | Van Huben et al. | |
| 6,339,423 B1 | 1/2002 | Sampson et al. | |
| 6,339,826 B2 | 1/2002 | Hayes et al. | |
| 6,341,352 B1 | 1/2002 | Child et al. | |
| 6,349,297 B1 | 2/2002 | Shaw et al. | |
| 6,353,886 B1 | 3/2002 | Howard et al. | |
| 6,360,363 B1 | 3/2002 | Moser et al. | |
| 6,363,400 B1 | 3/2002 | Chtchetkine et al. | |
| 6,366,915 B1 * | 4/2002 | Rubert et al. | 707/10 |
| 6,377,973 B2 | 4/2002 | Gideon | |
| 6,381,579 B1 | 4/2002 | Gervais et al. | |
| 6,385,627 B1 | 5/2002 | Cragun | |
| 6,393,474 B1 | 5/2002 | Eichert et al. | |
| 6,397,222 B1 | 5/2002 | Zellweger | |
| 6,397,231 B1 | 5/2002 | Salisbury et al. | |
| 6,412,070 B1 | 6/2002 | Van Dyke et al. | |
| 6,412,077 B1 | 6/2002 | Roden et al. | |
| 6,418,448 B1 | 7/2002 | Sarkar | |
| 6,430,556 B1 | 8/2002 | Goldberg et al. | |
| 6,457,007 B1 | 9/2002 | Kikuchi et al. | |
| 6,460,052 B1 | 10/2002 | Thomas et al. | |
| 6,460,141 B1 | 10/2002 | Olden | 713/201 |
| 6,466,239 B2 | 10/2002 | Ishikawa | |
| 6,473,791 B1 | 10/2002 | Al-Ghosein et al. | |
| 6,477,543 B1 | 11/2002 | Huang et al. | |
| 6,477,575 B1 | 11/2002 | Koeppel et al. | |
| 6,484,177 B1 | 11/2002 | Van Huben et al. | |
| 6,484,261 B1 | 11/2002 | Wiegel | |
| 6,487,594 B1 | 11/2002 | Bahlmann | |
| 6,493,732 B2 | 12/2002 | Aoyama et al. | |
| 6,505,212 B2 | 1/2003 | Nakano et al. | |
| 6,510,513 B1 | 1/2003 | Danieli | |
| 6,519,647 B1 | 2/2003 | Howard et al. | |
| 6,530,024 B1 | 3/2003 | Proctor | |
| 6,539,375 B2 | 3/2003 | Kawasaki | 707/5 |
| 6,571,247 B1 | 5/2003 | Danno et al. | 707/100 |
| 6,574,736 B1 | 6/2003 | Andrews | |
| 6,581,054 B1 | 6/2003 | Bogrett | |
| 6,581,071 B1 | 6/2003 | Gustman et al. | |
| 6,584,454 B1 | 6/2003 | Hummel et al. | |
| 6,587,849 B1 | 7/2003 | Mason et al. | 707/5 |
| 6,587,876 B1 | 7/2003 | Mahon et al. | |
| 6,601,233 B1 | 7/2003 | Underwood | |
| 6,615,218 B2 | 9/2003 | Mandal et al. | |
| 6,618,806 B1 | 9/2003 | Brown et al. | |
| 6,631,386 B1 | 10/2003 | Arun et al. | |
| 6,633,538 B1 | 10/2003 | Tanaka et al. | |
| 6,654,747 B1 | 11/2003 | Van Huben et al. | |
| 6,665,677 B1 | 12/2003 | Wotring et al. | |
| 6,668,354 B1 | 12/2003 | Chen et al. | 715/517 |
| 6,684,369 B1 | 1/2004 | Bernardo et al. | |
| 6,697,805 B1 | 2/2004 | Choquier et al. | |
| 6,721,888 B1 | 4/2004 | Liu et al. | |
| 6,728,713 B1 * | 4/2004 | Beach et al. | 707/10 |
| 6,732,144 B1 | 5/2004 | Kizu et al. | |
| 6,735,586 B2 | 5/2004 | Timmons | 707/3 |
| 6,735,701 B1 | 5/2004 | Jacobson | |
| 6,738,789 B2 | 5/2004 | Multer et al. | |
| 6,751,659 B1 | 6/2004 | Fenger et al. | |
| 6,754,672 B1 | 6/2004 | McLauchlin | 707/104.1 |
| 6,757,698 B2 | 6/2004 | McBride et al. | |
| 6,769,095 B1 | 7/2004 | Brassard et al. | |
| 6,769,118 B2 | 7/2004 | Garrison et al. | |
| 6,779,002 B1 | 8/2004 | Mwaura | |
| 6,789,202 B1 | 9/2004 | Ko et al. | |
| 6,834,284 B2 | 12/2004 | Acker et al. | |
| 6,853,997 B2 | 2/2005 | Wotring et al. | |
| 6,856,999 B2 | 2/2005 | Flanagin et al. | |
| 6,857,012 B2 | 2/2005 | Sim et al. | |
| 6,865,549 B1 | 3/2005 | Connor | |
| 6,868,425 B1 | 3/2005 | Bergstraesser et al. | |
| 6,880,005 B1 | 4/2005 | Bell et al. | |

| | | | | | |
|---|---|---|---|---|---|
| 6,889,222 B1 | 5/2005 | Zhao | 2002/0178119 A1 | 11/2002 | Griffin et al. |
| 6,901,403 B1 | 5/2005 | Bata et al. | 2002/0184521 A1 | 12/2002 | Lucovsky et al. |
| 6,904,454 B2 | 6/2005 | Stickler | 2002/0188869 A1 | 12/2002 | Patrick |
| 6,920,457 B2 | 7/2005 | Pressmar | 2002/0194267 A1 | 12/2002 | Flesner et al. |
| 6,922,695 B2 | 7/2005 | Skufea et al. | 2003/0014442 A1 | 1/2003 | Shiigi et al. |
| 6,934,532 B2 | 8/2005 | Coppinger et al. | 2003/0032409 A1 | 2/2003 | Hutcheson et al. |
| 6,934,934 B1 | 8/2005 | Osborne, II et al. | 2003/0037313 A1 | 2/2003 | Halpern et al. |
| 6,957,261 B2 | 10/2005 | Lortz | 2003/0046576 A1 | 3/2003 | High, Jr. et al. |
| 6,961,897 B1 | 11/2005 | Peel et al. | 2003/0065681 A1 | 4/2003 | Houston et al. |
| 6,965,999 B2 | 11/2005 | Fox et al. | 2003/0065721 A1 | 4/2003 | Roskind |
| 6,970,876 B2 | 11/2005 | Hotti et al. | 2003/0078972 A1 | 4/2003 | Tapissier et al. |
| 6,978,379 B1 | 12/2005 | Goh et al. | 2003/0088617 A1 | 5/2003 | Clark et al. |
| 6,985,905 B2 | 1/2006 | Prompt et al. | 2003/0097365 A1 | 5/2003 | Stickler |
| 6,985,915 B2 | 1/2006 | Somalwar et al. | 2003/0110448 A1 | 6/2003 | Haut et al. |
| 6,988,138 B1 | 1/2006 | Alcorn et al. | 2003/0120686 A1 | 6/2003 | Kim et al. |
| 7,003,578 B2 | 2/2006 | Kanada et al. | 2003/0126236 A1 | 7/2003 | Marl et al. |
| 7,020,641 B2 | 3/2006 | Leong et al. | 2003/0126464 A1 | 7/2003 | McDaniel et al. |
| 7,035,879 B2 | 4/2006 | Shi et al. | 2003/0126558 A1 | 7/2003 | Griffin |
| 7,035,944 B2 | 4/2006 | Fletcher et al. | 2003/0131113 A1 | 7/2003 | Reeves et al. ............... 709/229 |
| 7,043,472 B2 | 5/2006 | Aridor et al. | 2003/0135490 A1 | 7/2003 | Barrett et al. |
| 7,047,522 B1 | 5/2006 | Dixon et al. | 2003/0135576 A1 | 7/2003 | Bodin |
| 7,058,958 B1 | 6/2006 | Shutt et al. | 2003/0146937 A1 | 8/2003 | Lee |
| 7,062,490 B2 | 6/2006 | Adya et al. | 2003/0167315 A1 | 9/2003 | Chowdhry et al. |
| 7,062,511 B1 | 6/2006 | Poulsen | 2003/0167455 A1 | 9/2003 | Iborra et al. |
| 7,080,000 B1 | 7/2006 | Cambridge | 2003/0182308 A1 | 9/2003 | Ernst et al. |
| 7,085,755 B2 | 8/2006 | Bluhm et al. | 2003/0187956 A1 | 10/2003 | Belt et al. |
| 7,089,584 B1 | 8/2006 | Sharma | 2003/0204481 A1 | 10/2003 | Lau |
| 7,093,200 B2 | 8/2006 | Schreiber et al. | 2003/0212766 A1 | 11/2003 | Giles et al. |
| 7,093,261 B1 | 8/2006 | Harper et al. | 2003/0216938 A1 | 11/2003 | Shour |
| 7,093,283 B1 | 8/2006 | Chen et al. | 2003/0220913 A1 | 11/2003 | Doganata et al. |
| 7,096,224 B2 | 8/2006 | Murthy et al. | 2003/0220963 A1 | 11/2003 | Golovinsky et al. |
| 7,100,195 B1 | 8/2006 | Underwood | 2003/0229623 A1 | 12/2003 | Chang et al. .................. 707/3 |
| 7,117,207 B1 | 10/2006 | Kerschberg et al. | 2004/0003071 A1 | 1/2004 | Mathew et al. |
| 7,124,413 B1 | 10/2006 | Klemm et al. | 2004/0019650 A1 | 1/2004 | Auvenshine |
| 7,127,445 B2 | 10/2006 | Mogi et al. | 2004/0024812 A1* | 2/2004 | Park et al. .................. 709/203 |
| 7,174,563 B1 | 2/2007 | Brownlie et al. | 2004/0030744 A1 | 2/2004 | Rubin et al. |
| 7,219,140 B2 | 5/2007 | Marl et al. | 2004/0030795 A1 | 2/2004 | Hesmer et al. |
| 7,054,910 B1 | 8/2007 | Nordin et al. | 2004/0044648 A1 | 3/2004 | Anfindsen et al. |
| 7,278,106 B1 | 10/2007 | Mason | 2004/0078371 A1 | 4/2004 | Worrall et al. |
| 7,478,096 B2 | 1/2009 | Margolus et al. | 2004/0093344 A1* | 5/2004 | Berger et al. ................ 707/102 |
| 7,533,115 B2 | 5/2009 | Chou et al. | 2004/0098467 A1 | 5/2004 | Dewey et al. |
| 2001/0032128 A1 | 10/2001 | Kepecs | 2004/0122897 A1 | 6/2004 | Seeleman et al. |
| 2001/0034733 A1 | 10/2001 | Prompt et al. | 2004/0128559 A1 | 7/2004 | Zurko et al. |
| 2001/0034771 A1 | 10/2001 | Hutsch et al. | 2004/0167867 A1 | 8/2004 | Owen et al. |
| 2001/0044810 A1 | 11/2001 | Timmons | 2004/0167880 A1 | 8/2004 | Smith |
| 2001/0047485 A1 | 11/2001 | Brown et al. | 2004/0167899 A1 | 8/2004 | Patadia et al. |
| 2002/0005867 A1 | 1/2002 | Gvily | 2004/0183831 A1 | 9/2004 | Ritchy et al. |
| 2002/0019827 A1 | 2/2002 | Shiman et al. | 2004/0193606 A1 | 9/2004 | Arai et al. |
| 2002/0029296 A1 | 3/2002 | Anuff et al. | 2004/0205473 A1 | 10/2004 | Fisher et al. |
| 2002/0038308 A1 | 3/2002 | Cappi | 2004/0205557 A1 | 10/2004 | Bahrs et al. |
| 2002/0052849 A1 | 5/2002 | McCutchen et al. | 2004/0205653 A1 | 10/2004 | Hadfield et al. |
| 2002/0059394 A1 | 5/2002 | Sanders | 2004/0215650 A1 | 10/2004 | Shaji et al. |
| 2002/0062451 A1 | 5/2002 | Scheidt et al. | 2004/0230546 A1 | 11/2004 | Rogers |
| 2002/0067370 A1 | 6/2002 | Forney et al. | 2004/0243824 A1 | 12/2004 | Jones |
| 2002/0069261 A1 | 6/2002 | Bellare et al. ............... 709/218 | 2004/0249867 A1 | 12/2004 | Kraiss et al. |
| 2002/0087571 A1 | 7/2002 | Stapel et al. | 2005/0015368 A1 | 1/2005 | Payton et al. |
| 2002/0103818 A1 | 8/2002 | Amberden | 2005/0021502 A1 | 1/2005 | Chen et al. |
| 2002/0104071 A1 | 8/2002 | Charisius et al. | 2005/0021523 A1 | 1/2005 | Farag |
| 2002/0107913 A1 | 8/2002 | Rivera et al. ............... 709/203 | 2005/0044103 A1 | 2/2005 | MacLeod et al. |
| 2002/0111998 A1 | 8/2002 | Kim | 2005/0050184 A1 | 3/2005 | Boden et al. |
| 2002/0112171 A1 | 8/2002 | Ginter et al. | 2005/0060324 A1 | 3/2005 | Johnson et al. |
| 2002/0120685 A1 | 8/2002 | Srivastava et al. | 2005/0060332 A1 | 3/2005 | Bernstein et al. |
| 2002/0124053 A1 | 9/2002 | Adams et al. | 2005/0065937 A1 | 3/2005 | Degenaro et al. |
| 2002/0135617 A1 | 9/2002 | Samid | 2005/0080814 A1 | 4/2005 | Hailey et al. |
| 2002/0143819 A1 | 10/2002 | Han et al. | 2005/0086206 A1 | 4/2005 | Balasubramanian et al. |
| 2002/0147645 A1 | 10/2002 | Alao et al. | 2005/0086296 A1 | 4/2005 | Chi et al. |
| 2002/0152210 A1 | 10/2002 | Johnson et al. | 2005/0097008 A1 | 5/2005 | Ehring et al. |
| 2002/0152267 A1 | 10/2002 | Lennon | 2005/0102535 A1 | 5/2005 | Patrick et al. |
| 2002/0152279 A1 | 10/2002 | Sollenberger et al. | 2005/0102536 A1 | 5/2005 | Patrick et al. |
| 2002/0161903 A1 | 10/2002 | Besaw | 2005/0114672 A1 | 5/2005 | Duncan et al. |
| 2002/0169893 A1 | 11/2002 | Chen et al. | 2005/0198617 A1 | 9/2005 | Kim et al. |
| 2002/0173971 A1 | 11/2002 | Stirpe et al. .................... 705/1 | 2005/0216462 A1 | 9/2005 | Xiao |
| 2002/0174097 A1 | 11/2002 | Rusch et al. | 2006/0041661 A1 | 2/2006 | Erikson et al. |

| | | | |
|---|---|---|---|
| 2006/0059107 | A1 | 3/2006 | Elmore et al. |
| 2006/0085412 | A1 | 4/2006 | Johnson et al. |
| 2006/0122882 | A1 | 6/2006 | Brown et al. |
| 2006/0184878 | A1 | 8/2006 | Argo et al. |
| 2006/0212796 | A1 | 9/2006 | Heuer et al. |
| 2007/0083484 | A1 | 4/2007 | McVeigh et al. |
| 2007/0179954 | A1 | 8/2007 | Kudoh et al. |

FOREIGN PATENT DOCUMENTS

| | | |
|---|---|---|
| WO | 00/22547 A | 4/2000 |
| WO | WO 00/38078 | 6/2000 |
| WO | WO 01/14962 | 3/2001 |
| WO | WO 01/67285 | 9/2001 |

OTHER PUBLICATIONS

BEA WebLogic Portal—Development Guide, Release 7.0 Service Pack 1, Document Date: Dec. 2002, 626 pages.

Java Content Repository—JSR-170, Author: David Nuescheler et al., Document history: version 0.1—Apr. 24, 2002; version 0.2—May 10, 2002; version 0.3—May 17, 2002; version 0.4—Jul. 17, 2002; version 0.5—Sep. 16, 2002, and version 0.6—Nov. 26, 2002, pp. 1-99.

Sundsted, Todd, "JNDI Overview, Part 1: An Introduction to Naming Services", JavaWorld, Jan. 2000. pp. 1-6, (downloaded from: www.javaworld.com/javaworld/jw-01-2000/jw-01-howto_p.html.).

Moore, Bill, et al., "Migrating Weblogic Applications to WebSphere Advanced Edition", IBM Redbooks, Jan. 2001, pp. 1, 3-4, 109-111 and 181-195.

Barrett, Alexandra, "Trying Out Transactions", SunExpert Magazine, Jan. 1999, pp. 57-59.

Ayers, Danny, et al., Professional Java Server Programming, Wrox Press, Ltd., Birmingham, UK, Dec. 1999, pp. 515-545.

Ford, Nigel, Web Developer.com Guide to Building Intelligent Web Sites with JavaScript, Wiley Computer Publishing, NY, NY © 1998, pp. 65-86, 96-98, 101-102, 245-250 and 324-327.

Microsoft Computer Dictionary, $4^{th}$ Edition, Microsoft Press, Redmond, WA, © 1999, p. 489.

Eiji Okamoto, "Proposal for Integrated Security Systems", Jun. 1992, IEEE Computer Society Press, p. 354-358.

http://java.sun.com/products/ejb/ (last visit: Dec. 7, 2004).

http://www.javaworld.com/jw-12-2002/jw-1207-yesnoejb_p.html (last visit: Dec. 7, 2004).

Symborski, Carl W., "Updating Software and Configuration Data in a Distributed Communications Network"; IEEE Computer Networking Symposium, pp. 331-338 (1988).

Adomavicius, Gediminas, et al., "User Profiling in Personalization Applications Through Rule Discovery and Validation", KDD '99, ACM San Diego, CA, pp. 377-381 (1999).

Cingil, Ibrahim, et al., "A Broader Approach to Personalization", Communications of the ACM, vol. 43, No. 6, pp. 136-141 (Aug. 2000).

Stephanidis, Constantine, et al., "Decision Making in Intelligent User Interfaces", IUI '97, ACM Orlando, FL, pp. 195-202 (1997).

Stiemerling, Oliver, et al., "How to Make Software Softer—Desigining Tailorable Applications", DIS '97, ACM, Amsterdam, The Netherlands, pp. 365-376 (1997).

Zhang, Zheng, et al., "Designing a Robust Namespace for Distributed File Services", Reliable Distributed Systems, Proceedings 20th IEEE Symposium on Oct. 28-31, 2001, pp. 162-171 (2001).

Adya, Atul, et al., "FARSITE: Federated, Available and Reliable Storage for an Incompletely Trusted Environment", ACM SIGOPS Operating Systems Review, vol. 36, Issue SI, OSDI '02: Proceedings of the 5th Symposium on Operating Systems Design and Implementation, pp. 1-14 (Winter 2002).

Freudenthal, Eric, et al. "dRBAC: Distributed Role-Based Access Control for Dynamic Coalition Environments", Proceedings of the 22nd International Conference on Distributed Computing Systems (ICDCS '02) IEEE 2002, 10 pages.

Kistler, T., et al., "WebL—a programming language for the Web", Computer Networks and ISDN Systems, North Holland Publishing, Amsterdam, NL, vol. 30, No. 1-7, pp. 259-270 (Apr. 1998).

Levy, M.R., "Web Programming in Guide", Software Practice & Experience, Wiley & Sons, Bognor Regis, GB, vol. 28, No. 15, pp. 1581-1603 (Dec. 25, 1998).

Atkins, D.L., et al., "Mawl: A Domain-Specific Language for Form-Based Services", IEEE Transactions on Software Engineering, IEEE Service Center, Los Alamitos, CA, US, vol. 25, No. 3, pp. 334-346 (May 1999).

Supplementary European Search Report for 027238740.0 dated Jun. 7, 2006, 3 pages.

Supplementary European Search Report for 02773915.0 dated Oct. 12, 2006, 3 pages.

Supplementary European Search Report for 01975484.5 dated Dec. 19, 2006, 2 pages.

Browne, et al., "Location-Independent Naming for Virtual Distributed Software Repositories", http://portal.acm.org/dl.cfm, ACM Symposium on Software Reusability, Seattle, WA, US, Aug. 1995, vol. 20, Issue SI, pp. 179-185.

Candan, K.S., et al., "Enabling Dynamic Content Caching for Database-Driven Web Sites", Proceedings of the 2001 ACM SIGMOD International Conference on Management of Data, Santa Barbara, California, USA, May 21-24, 2001, pp. 532-543 (2001).

Catley, Christina, et al., "Design of a Health Care Architecture for Medical Data Interoperability and Application Integration", Proceedings of the Second Joint EMBS/BMES Conference, Houston, TX, USA, Oct. 23-26, 2002, IEEE, vol. 3, pp. 1952-1953 (2002).

Howes, T., "The String Representation of LDAP Search Filters", ftp://ftp.rfc-editor.org/in-notees/rfc2254.txt, The Internet Society, RFC 2254, 8 pages (Dec. 1997).

Hayton, R.J. et al., "Access Control in an Open Distributed Environment," 1998 Proceedings of the IEEE Symposium on Security & Privacy, May 3-6, 1998, Oakland, California, USA, 12 pages.

Bertino, Elisa et al., "TRBAC: A Temporal Role-Based Access Control Model," ACM Transactions on Information and System Security (TISSEC), vol. 4, Issue 3 (Aug. 2001), pp. 191-223.

Sandhu, Ravi S. et al., "Role-Based Access Control Models," IEEE Computer, vol. 29, No. 2, Feb. 1996, pp. 38-47.

Covington, Michael J. et al., "Securing Context-Aware Applications Using Environment Roles," ACM Workshop on Role Based Access Control, Proceedings of the Sixth ACM Symposium on Access Control Models and Technologies, SACMAT '01, May 3-4, 2001, Chantilly, Virginia, USA, pp. 10-20.

Yao, Walt et al., "A Model of OASIS Role-Based Access Control and Its Support for Active Security," ACM Workshop on Role Based Access Control, Proceedings of the Sixth ACM Symposium on Access Control Models and Technologies, SACMAT '01, May 3-4, 2001, Chantilly, Virginia, USA, pp. 171-181.

Georgiadis, Christos K. et al., "Flexible Team-Based Access Control Using Contexts," ACM Workshop on Role Based Access Control, Proceedings of the Sixth ACM Symposium on Access Control Models and Technologies, SACMAT '01, May 3-4, 2001, Chantilly, Virginia, USA, pp. 21-27.

Tzelepi, Sofia K. et al., "A Flexible Content and Context-Based Access Control Model for Multimedia Medical Image Database Systems," International Multimedia Conference, Proceedings of the 2001 ACM Workshop on Multimedia and Security: New Challenges, Oct. 5, 2001, pp. 52-55.

Goh, Chen et al., "Towards a More Complete Model of Role," Symposium on Access Control Models and Technologies, Proceedings of the Third ACM Workshop on Role-Based Access Control, 1998, Fairfax, Virginia, USA, pp. 55-61.

Lee et al., Keeping Virtual Information Resources Up and Running, Nov. 1997, IBM Press, pp. 1-14.

Rossi, Gustavo et al., "Designing Personalized Web Applications," ACM, WWW10, Hong Kong, May 1-5, 2001, pp. 275-284.

Hunter, Jason, "Java Servlet Programming," Second Edition, O'Reilly, Apr. 11, 2001, 19 pages.

Tanyi, Emmanuel, Easy XML, Mar. 6, 2000, www.winsite.com, pp. 1-6.

IBM TDB, "Method and System for Visually Constructing Document Type Definitions and Related Artifacts Using a Reusable Object Model", IBM Technical Disclosure Bulletin, IP.com, Inc., May 23, 2001, 3 pages.

"USDataCenters Chooses Baltimore SelectAccess to Enable Next Generation Security Solutions for eBusiness", Business Wire, Apr. 4, 2001, pp. 1-2.

Parker, Elisabeth, "Microsoft FrontPage 2000", 1999, QUE, pp. 7, 52, and 55.

Dimov, Dmitry, "BEA Weblogic Portal Technical Overview," Feb. 20, 2002, 7 pages, Retrieved from http://weblogic.sys-con.com/node/42694.

Schonhoff, M. et al., "Version Propagation in Federated Database Systems," Proceedings of the 2001 International Database Engineering and Applications Symposium, Grenoble, France, Jul. 16-18, 2001, pp. 189-198.

Saracco, C.M., et al., "Enabling Distributed Enterprise Integration with WebSphere and DB2 Information Integrator," IBM Systems Journal, IBM Corporation, Armonk, New York, USA, vol. 43, No. 2, 2004, pp. 255-269.

Roth, M.A. et al., "Information Integration: A New Generation of Information Technology," IBM Systems Journal, IBM Corporation, Armonk, New York, USA, vol. 41, No. 4, 2002, pp. 563-577.

Moreira, V. et al., "Schema Versioning: Queries to the Generalized Temporal Database System," Proceedings of the 10th International Workshop on Database and Expert Systems Applications, 1999, Florence, Italy, Sep. 1-3, 1999, pp. 458-459.

Parent, C., et al., "Issues and Approaches of Database Integration," Communications of the Association for Computing Machinery, ACM, vol. 41, No. 5, Jan. 1, 1998, pp. 168-178.

Draper, D., et al., "The Nimble XML Data Integration System," Proceedings of the 17th International Conference on Data Engineering, Heidelberg, Germany, Apr. 2-6, 2001, pp. 155-160.

Sheth, et al., "Federated Databases Systems for Managing Distributed, Heterogeneous and Autonomous Databases," Retrieved from the Internet: URL:<http://www.acm.org/pubs/contents/journals/surveys/1990-22-3/p183-sheth/p183-sheth.pdf> Retrieved on Mar. 2, 2000.

Roddick, J.F., "A Survey of Schema Versioning Issues for Database Systems," Information and Software Technology, Elsevier, Amsterdam, NL, vol. 37, No. 7, Jul. 1, 1995, pp. 383-393.

Supplemental European Search Report in connection with EP 05 73 3884 dated Jul. 13, 2009, 9 pages.

* cited by examiner

VIRTUAL CONTENT REPOSITORY APPLICATION PROGRAM INTERFACE

CLAIM OF PRIORITY

This application claims priority from the following application, which is hereby incorporated by reference in its entirety:

SYSTEM AND METHOD FOR VIRTUAL CONTENT REPOSITORY, U.S. Provisional Patent Application Ser. No. 60/449,154, Inventors: James Owen, et al., filed on Feb. 20, 2003, SYSTEMS AND METHODS FOR PORTAL AND WEB SERVER ADMINISTRATION, U.S. Provisional Patent Application No. 60/451,174, Inventors: Christopher Bales, et al., filed on Feb. 28, 2003.

CROSS-REFERENCE TO RELATED APPLICATIONS

This application is related to the following co-pending applications which are each hereby incorporated by reference in their entirety:

FEDERATED MANAGEMENT OF CONTENT REPOSITORIES, U.S. application Ser. No. 10/618,513, Inventors: James Owen, et al., filed on Jul. 11, 2003, now U.S. Pat. No. 7,293,286, issued Nov. 6, 2007.

VIRTUAL REPOSITORY CONTENT MODEL, U.S. application Ser. No. 10/618,519, Inventors: James Owen, et al., filed on Jul. 11, 2003, now U.S. Pat. No. 7,483,904, Jan. 27, 2009.

VIRTUAL REPOSITORY COMPLEX CONTENT MODEL, U.S. application Ser. No. 10/618,380, Inventor: James Owen et al., filed on Jul. 11, 2003, now U.S. Pat. No. 7,415,478, issued Aug. 19, 2008.

SYSTEM AND METHOD FOR A VIRTUAL CONTENT REPOSITORY, U.S. application Ser. No. 10/618,495, Inventors: James Owen, et al., filed on Jul. 11, 2003.

SYSTEM AND METHOD FOR SEARCHING A VIRTUAL REPOSITORY CONTENT, U.S. application Ser. No. 10/619,165, Inventor: Gregory Smith, filed on Jul. 11, 2003.

VIRTUAL CONTENT REPOSITORY BROWSER, U.S. application Ser. No. 10/618,379, Inventors: Jalpesh Patadia et al., filed on Jul. 11, 2003, now U.S. Pat. No. 7,562,298, issued Jul. 14, 2009.

FIELD OF THE DISCLOSURE

The present invention disclosure relates to content management, and in particular, a system and method for integrating disparate content repositories.

BACKGROUND

Content repositories manage and provide access to large data stores such as a newspaper archives, advertisements, inventories, image collections, etc. A content repository can be a key component of a Web application such as a Web portal, which must quickly serve up different types of content in response to a particular user's requests. However, difficulties can arise when trying to integrate more than one vendor's content repository. Each may have its own proprietary application program interface (API), conventions for manipulating content, and data formats. Performing a search across different repositories, for example, could require using completely different search mechanisms and converting each repository's search results into a common format. Furthermore, each time a repository is added to an application, the application software must be modified to accommodate these differences.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Parts of the description will be presented in data processing terms, such as data, selection, retrieval, generation, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Various embodiments will be illustrated in terms of exemplary classes and/or objects in an object-oriented programming paradigm. It will be apparent to one skilled in the art that the present invention can be practiced using any number of different classes/objects, not merely those included here for illustrative purposes. Furthermore, it will also be apparent that the present invention is not limited to any particular software programming language or programming paradigm.

Figure 1:
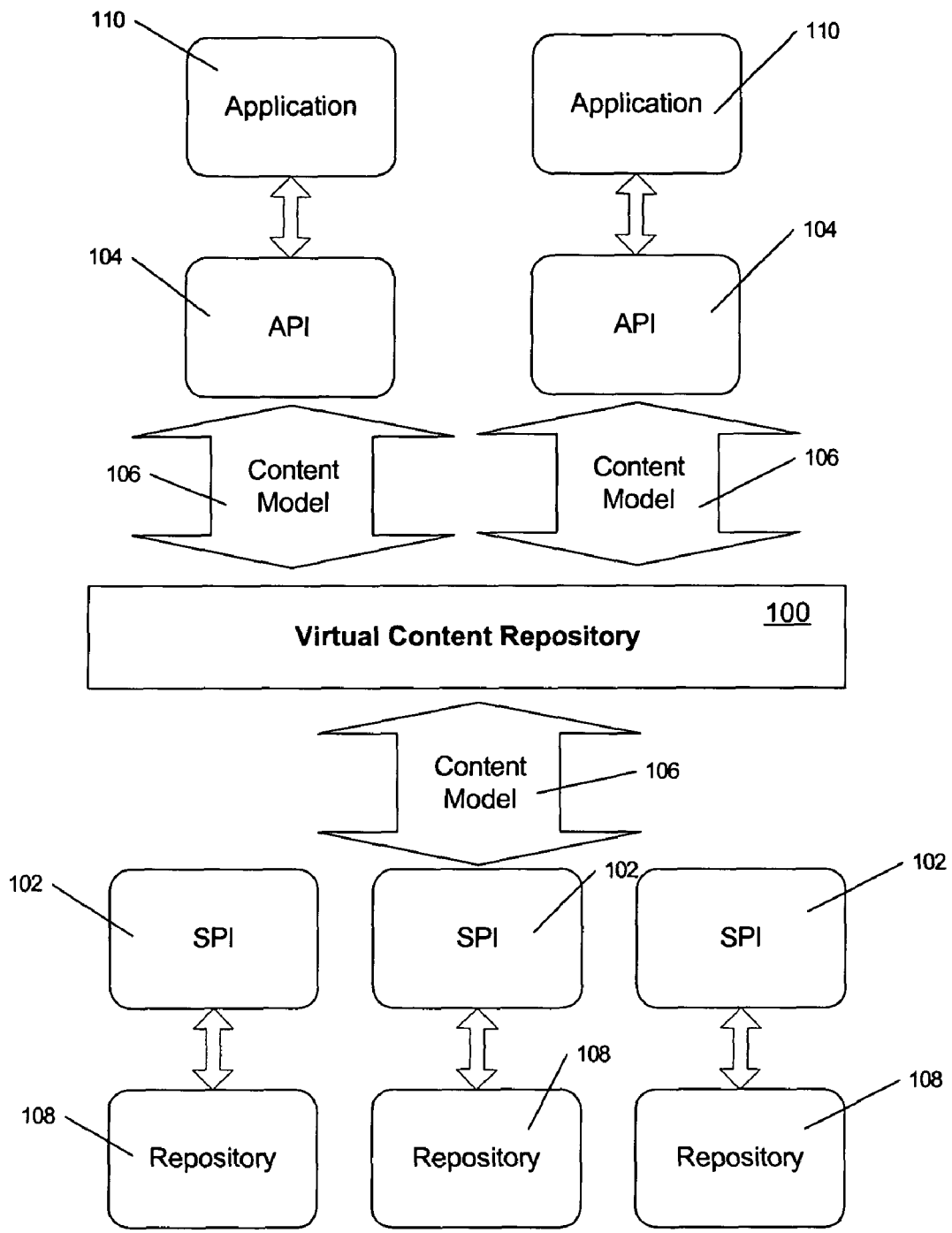
FIG. 1 is an illustration of a virtual content management framework in one embodiment of the invention.

FIG. 1 is an illustration of a virtual content management framework in one embodiment of the invention. A content repository 108 is a searchable data store. Such systems can relate structured content and unstructured content (e.g., digitally scanned paper documents, eXtensible Markup Language, Portable Document Format, Hypertext Markup Language, electronic mail, images, video and audio streams, raw binary data, etc.) into a searchable corpus. Content repositories can be coupled to or integrated with content management systems. Content management systems provide for content life cycle management (e.g. versioning), content review and approval, automatic content classification, event-driven content processing, process tracking and content delivery to other systems. For example, if a user fills out a loan application on a web portal, the web portal can forward the application to a content repository which, in turn, can contact a bank system, receive notification of loan approval, update the loan application in the repository and notify the user by rendering the approval information in a format appropriate for the web portal.

A virtual or federated content repository (hereinafter referred to as "VCR") 100 is a logical representation of one or more individual content repositories 108 such that they appear and behave as a single content repository from an application program's standpoint. This is accomplished in part by use of an API (application program interface) 104 and an SPI (service provider interface) 102. An API describes how an application program, library or process can interface with some program logic or functionality. By way of a non-limiting illustration, a process can include a thread, a server, a servlet, a portlet, a distributed object, a web browser, or a lightweight process. An SPI describes how a service provider (e.g., a content repository) can be integrated into a system of some kind. SPI's are typically specified as a collection of classes/interfaces, data structures and functions that work together to provided a programmatic means through which a service can be accessed and utilized. By way of a non-limiting example, APIs and SPIs can be specified in an object-oriented programming language, such as Java™ (available from Sun Microsystems, Inc. of Mountain View, Calif.) and C# (available from Microsoft Corp. of Redmond, Wash.). The API and SPI can be exposed in a number of ways, including but not limited to static libraries, dynamic link libraries, distributed objects, servers, class/interface instances, etc.

In one embodiment, the API presents a unified view of all repositories to application programs and enables them to navigate, perform CRUD (create, read, update, and delete) operations, and search across multiple content repositories as though they were a single repository. Content repositories that implement the SPI can "plug into" the VCR. The SPI includes a set of interfaces and services that repositories can implement and extend including schema management, hierarchy operations and CRUD operations. The API and SPI share a content model 106 that represents the combined content of all repositories 108 as a hierarchical namespace of nodes (or hierarchy). Given a node N, nodes that are hierarchically inferior to N are referred to as children of N whereas nodes that are hierarchically superior to N are referred to as parents of N. The top-most level of the hierarchy is called the federated root. There is no limit to the depth of the hierarchy.

In one embodiment, content repositories can be children of the federated root. Each content repository can have child nodes. Nodes can represent hierarchy information or content. Hierarchy nodes serve as a container for other nodes in the hierarchy akin to a file subdirectory in a hierarchical file system. Content nodes can have properties. In one embodiment, a property associates a name with a value of some kind. By way of a non-limiting illustration, a value can be a text string, a number, an image, an audio/visual presentation, binary data, etc. Either type of node can have a schema associated with it. A schema describes the data type of one or more of a node's properties.

Figure 2:
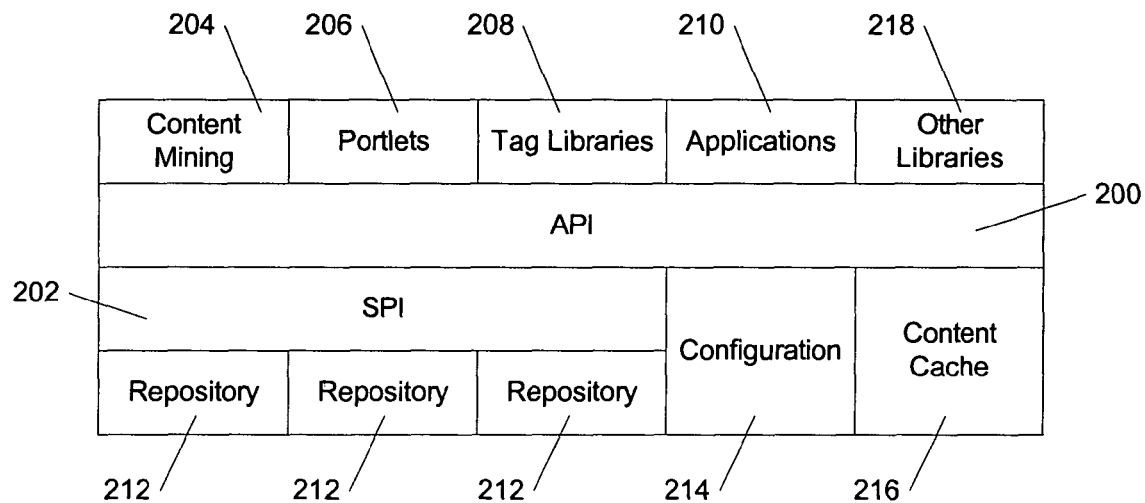
FIG. 2 is an illustration of functional layers in one embodiment of the invention.

FIG. 2 is an illustration of functional layers in one embodiment of the invention. API 200 is layered on top of SPI 202. The SPI layer isolates direct interaction with repositories 212 from the API. In one embodiment, this can be accomplished at run-time wherein the API library dynamically links to or loads the SPI library. In another embodiment, the SPI can be part of a server process such that the API and the SPI can communicate over a network. The SPI can communicate with the repositories using any number of means including, but not limited to, shared memory, remote procedure calls and/or via one or more intermediate server processes.

Referring again to FIG. 2 and by way of a non-limiting example, content mining facilities 204, portlets 206, tag libraries 208, applications 210, and other libraries 218 can all utilize the API to interact with a VCR. Content mining facilities can include services for automatically extracting content from the VCR based on parameters. Portlet and Java ServerPages™ tag libraries enable portals to interact with the VCR and surface its content on web pages. (Java ServerPages is available from Sun Microsystems, Inc.) In addition, application programs and other libraries can be built on top of the API.

In one embodiment, the API can include optimizations to improve the performance of interacting with the VCR. One or more content caches 216 can be used to buffer search results and recently accessed nodes. Content caches can include node caches and binary caches. A node cache can be used to provide fast access to recently accessed nodes. A binary cache can be used to provide fast access to the data associated with each node in a node cache. The API can also provide a configuration facility 214 to enable applications, tools and libraries to configure content caches and the VCR. In one embodiment, this facility can be implemented as a Java Management Extension (available from Sun Microsystems, Inc.). Exemplary configuration parameters are provided in Table 1.

TABLE 1

Exemplary Configuration Parameters
CONFIGURATION PARAMETERS

Active state for a binary cache of a repository (i.e., turn the cache on or off).
Maximum number of entries for a binary cache of a repository.
Time-to-live for entries in a binary cache of a repository.
Repository name.
Active state for a node cache of a repository (i.e., turn the cache on or off).
Max entries for a node cache of a repository.
Time-to-live for entries in a node cache of a repository.
Password and username for a repository.
Read-only attribute for the repository.

Figure 3:
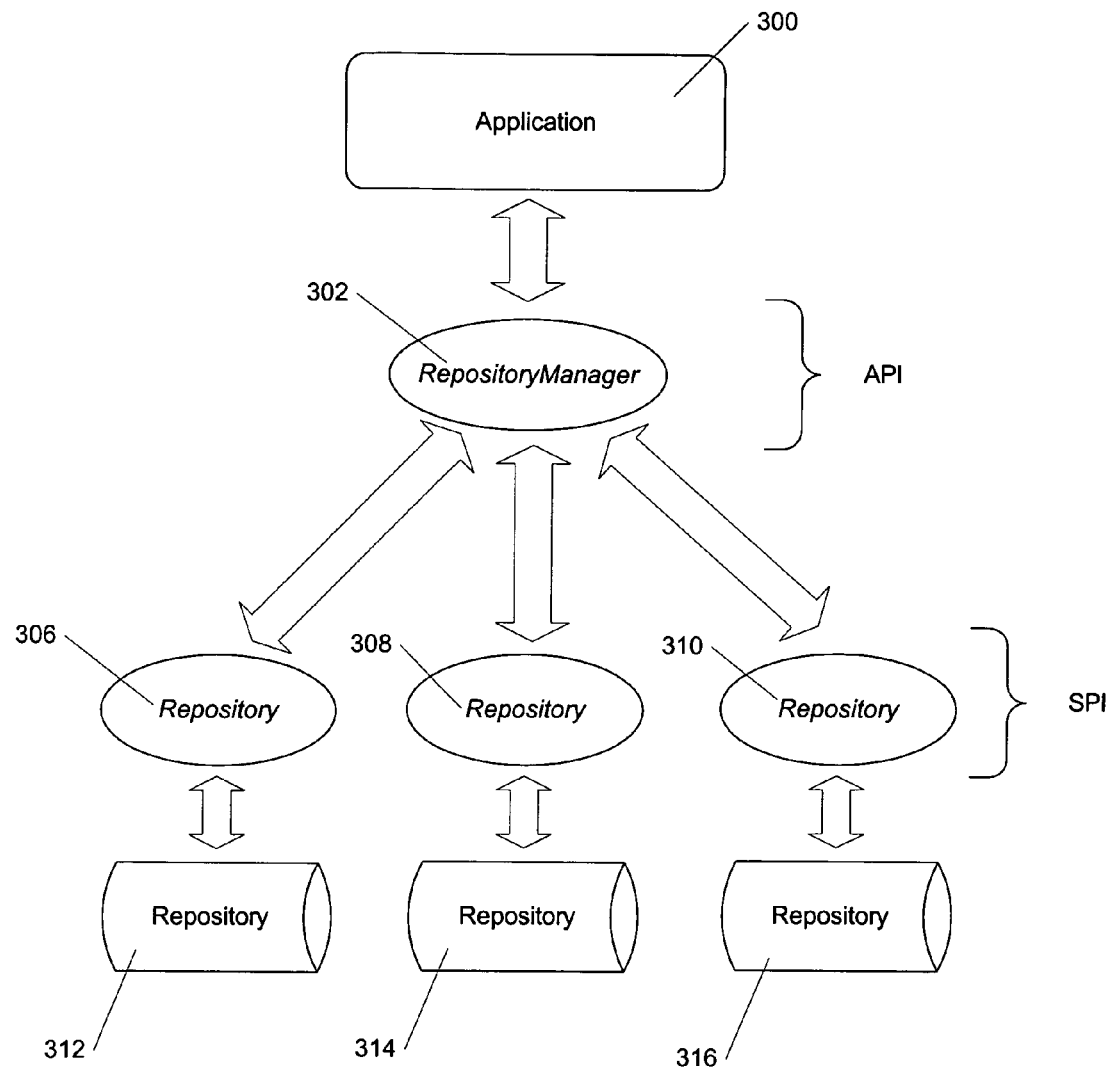
FIG. 3 is an illustration of objects used in connecting a repository to a virtual content repository in one embodiment of the invention.

FIG. 3 is an illustration of objects used in connecting a repository to a VCR in one embodiment of the invention. In one embodiment, objects implementing API interface RepositoryManager 302 can serve as an representation of a VCR from an application program's standpoint. A RepositoryManager connect( ) method attempts to connect all available repositories with a current user's credentials to the VCR. By way of a non-limiting example, credentials in one embodiment can based on the Java™ Authentication and Authorization Service (available from Sun Microsystems, Inc.). Those of skill in the art will recognize that many authorization schemes are possible without departing from the scope and spirit of the present embodiment. Each available content repository is represented by an SPI Repository object 306-310. The RepositoryManager object invokes a connect( ) method on a set of Repository objects. In one embodiment, a RepositorySession object (not shown) can be instantiated for each content repository to which a connection is attempted. In one embodiment, the RepositoryManager connect( ) method can return an array of the RepositiorySessions to the application program, one for each repository for which a connection was attempted. Any error in the connection procedure can be described by the RepositorySession object's state. In another embodiment, the RepositoryManager connect( ) method can connect to a specific repository using a current user's credentials and a given repository name. In one embodiment, the name of a repository can be a URI (uniform resource identifier).

Figure 4:
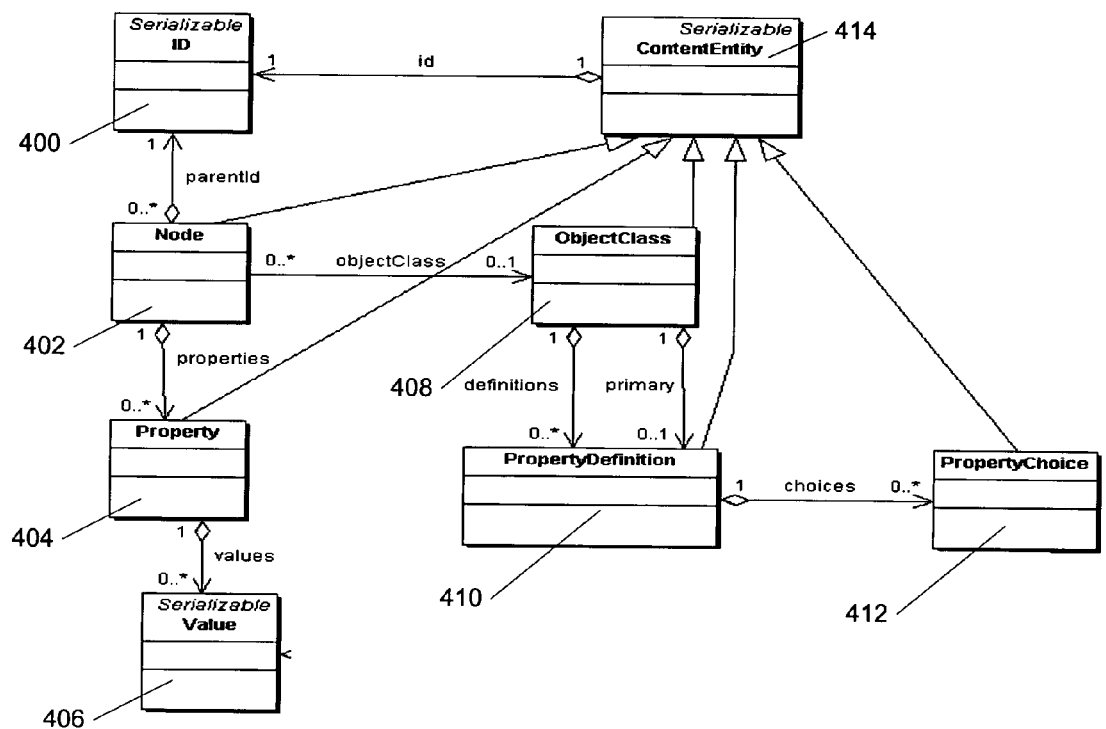
FIG. 4 is an exemplary content model in one embodiment of the invention.

FIG. 4 is an exemplary content model in one embodiment of the invention. The content model is shared between the API and the SPI. Each box in FIG. 2 represents a class or an interface. Hollow tipped arrows connecting boxes indicate inheritance relationships wherein the class/interface from which the arrows emanate inherit from the class/interface to which the arrows point. Solid tipped arrows indicate that the objects of the class/interface from which the arrows emanate can contain or have references (e.g., pointers or addresses) to objects of the class/interface to which the arrows point. In one embodiment, each object in a VCR has an identifier that uniquely identifies it. An identifier can be represented by an ID 400 (or id). An id can contain the name of a content repository and a unique id provided to it by the repository. In one embodiment, the id class/interface can be made available through a common super class/interface 414 that can provide services such as serialization, etc.

In one embodiment, content and hierarchy nodes can be represented by a Node 402 (or node). A node has a name, an id, and can also include a path that uniquely specifies an the node's location in the VCR hierarchy. By way of a non-limiting example, the path can be in a Unix-like directory path format such as '/a/b/c' where '/' is a federated root, 'a' is a repository, 'b' is a node in the 'a' repository, and 'c' is the node's name. The Node class provides methods by with a node's parent and children can be obtained. This is useful for applications and tools that need to traverse the VCR hierarchy (e.g., browsers). Nodes can be associated with zero or more Property 404 objects (or properties). A property can have a name and zero or more values 406. In one embodiment, a property's name is unique relative to the node to which the property is associated. A Value 406 can represent any value, including but not limited to binary, Boolean, date/time, floating point, integer or string values. If a property has more than one value associated with it, it is referred to as "multi-valued".

A node's properties can be described by a schema. A schema can be referred to as "metadata" since it does not constitute the content (or "data") of the VCR per se. Schemas can be represented by an ObjectClass 408 object and zero or more PropertyDefinition 410 objects. An ObjectClass has a schema name that uniquely identifies it within a content repository. A node can refer to a schema using the Object-Class name. In another embodiment, a content node can define its own schema by referencing an ObjectClass object directly. In one embodiment, there is one PropertyDefinition object for each of a node's associated Property objects. PropertyDefinition objects define the shape or type of properties. Schemas can be utilized by repositories and tools that operate on VCRs, such as hierarchical browsers. By way of a non-limiting example, a hierarchy node's schema could be used to provide information regarding its children or could be used to enforce a schema on them. By way of a further non-limiting example, a VCR browser could use a content node's schema in order to properly display the node's values.

In one embodiment, a PropertyDefinition can have a name and can describe a corresponding property's data type (e.g., binary, Boolean, string, double, calendar, long, reference to an external data source, etc.), whether it is required, whether it is read-only, whether it provides a default value, and whether it specifies a property choice type. A property choice can indicate if a property is a single unrestricted value, a single restricted value, a multiple unrestricted value, or a multiple restricted value. Properties that are single have only one value whereas properties that are multiple can have more than one value. If a property is restricted, its value(s) are chosen from a finite set of values. But if a property is unrestricted, any value(s) can be provided for it. PropertyChoice objects 412 can be associated with a PropertyDefinition object to define a set of value choices in the case where the PropertyDefinition is restricted. A choice can be designated as a default value, but only one choice can be a default for a given PropertyDefinition.

A PropertyDefinition object may also be designated as a primary property. By way of a non-limiting example, when a schema is associated with a node, the primary property of a node can be considered its default content. The isPrimary( ) method of the PropertyDefinition class returns true if a PropertyDefinition object is the primary PropertyDefinition. By way of a further non-limiting example, if a node contained a binary property to hold an image, it could also contain a second binary property to represent a thumbnail view of the image. If the thumbnail view was the primary property, software applications such as browser could display it by default.

Figure 5:
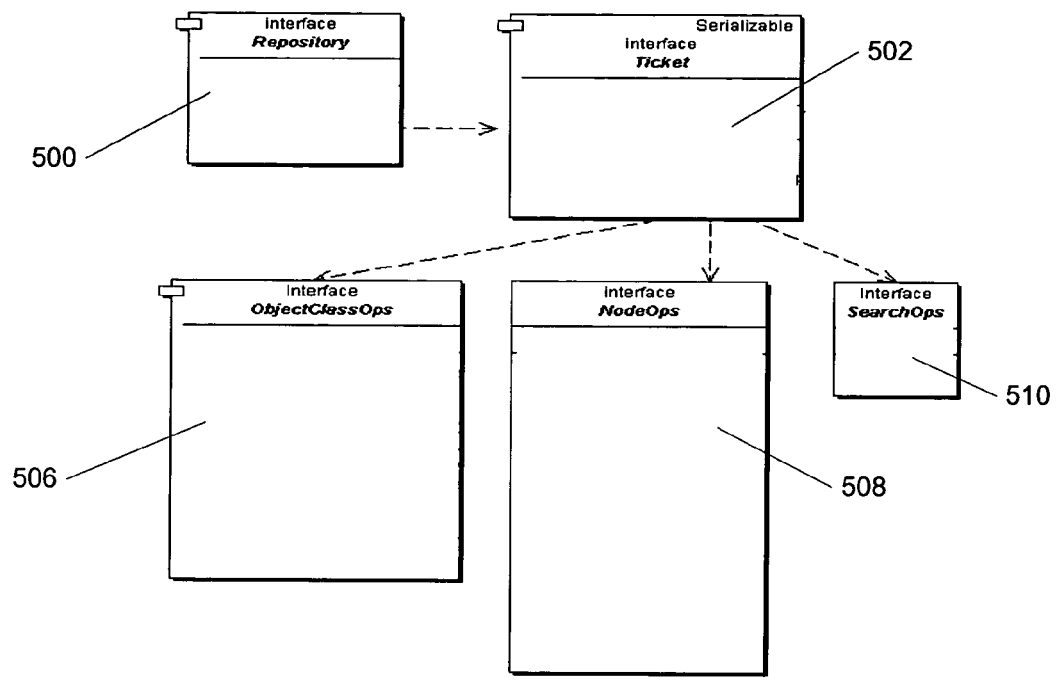
FIG. 5 is an exemplary service model in one embodiment of the invention.

FIG. 5 is an exemplary service model in one embodiment of the invention. Each box in FIG. 5 represents a class or an interface. A dashed arrow indicates that the interface from which the arrow emanates can produce at run-time objects implementing the classes to which the arrow points. A content repository's implementation of the SPI is responsible for mapping operations on the content model to the particulars of a given content repository. Repository interface 500 represents a content repository and facilitates connecting to it. The Repository has a connect( ) method that returns an object of type Ticket 502 (or ticket) if a user is authenticated by the repository. In one embodiment, tickets are intended to be light-weight objects. As such, one or more may be created and possibly cached for each client/software application accessing a given repository.

A ticket can utilize a user's credentials to authorize a service. In one embodiment, a ticket can be the access point for the following service interfaces: NodeOps 508, ObjectClassOps 506, and SearchOps 510. An application program can obtain objects that are compatible with these interfaces through the API RepositoryManager class. The NodeOps interface provides CRUD methods for nodes in the VCR. Nodes can be operated on based on their id or through their path in the node hierarchy. Table 2 summarizes NodeOp class functionality exposed in the API.

TABLE 2

NodeOps Functionality
NodeOps FUNCTIONALITY

Update a given node's properties and property definitions.
Copy a given node to a new location in a given hierarchy along with all its descendants.
Create a new content node underneath a given parent.
Create a new hierarchy node underneath a given parent.
Perform a full cascade delete on a given node.
Retrieve all the nodes in a given node's path including itself.
Retrieve content node children for the given parent node.
Retrieve hierarchy node children for the given parent node.
Retrieve a node based on its ID.
Retrieve a node based on its path.
Retrieve the children nodes for the given hierarchy node.
Retrieve all the nodes with a given name.
Retrieve the Binary data for given node and property ids.
Moves a node to a new location in the hierarchy along with all its descendants.
Remove the ObjectClass from a given node.
Renames a given node and implicitly all of its descendants paths.

Figure 6:
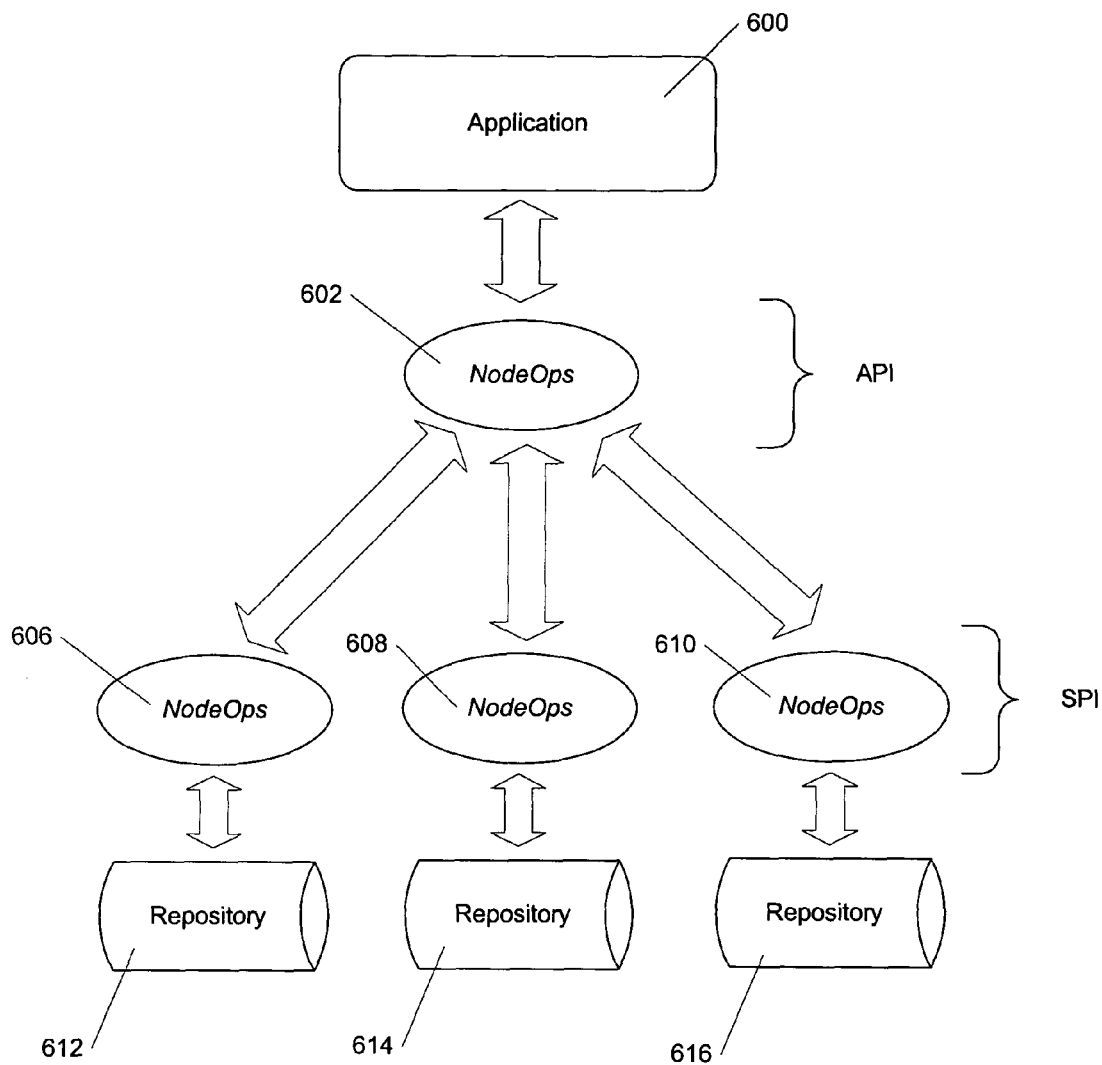
FIG. 6 is an illustration of NopeOps service interaction in one embodiment of the invention.

FIG. 6 is an illustration of NopeOps service interaction in one embodiment of the invention. Application 600 utilizes a NodeOps object 602 provided by the API which in turn utilizes one or more NodeOps objects 606-610 provided by an SPI Ticket. Each repository 612-616 is represented by a NodeOps object. When the API NodeOps 602 receives a request to perform an action, it maps the request to one or more SPI NodeOps objects 606-610 which in turn fulfill the request using their associated repositories. In this way, applications and libraries utilizing the API see a the VCR rather than individual content repositories.

As with the NodeOps service, there is one SPI ObjectClassOps object per repository and a single API ObjectClassOps object. The API ObjectClassOps object maps requests to one or more SPI ObjectClassOps which in turn fulfill the requests using their respective repositories. Through this service, ObjectClass and PropertyDefinition objects can be operated on based on their id or through their path in the node hierarchy. Table 3 summarizes ObjectClassOps class functionality exposed in the API.

TABLE 3

ObjectClassOps Functionality
ObjectClassOps FUNCTIONALITY

Create an ObjectClass, create PropertyDefinition(s) and associate them with the ObjectClass.
Add a given PropertyDefinition to an ObjectClass.
Delete an ObjectClass.
Delete a PropertyDefinition.
Retrieve an ObjectClass with a given id.
Retrieve all ObjectClass(es) available for all content repositories a given user is currently authenticated for.
Retrieve all of the ObjectClass(es) available for a given content repository.
Retreive a BinaryValue for the given PropertyChoice.
Retreive a PropertyDefinition.
Retrieve all PropertyDefinitions for the given ObjectClass.
Rename the given ObjectClass.
Updates the given PropertyDefinition.

As with the NodeOps and ObjectClassOps services, there is one SPI SearchOps object per repository and a single API SearchOps object. The API SearchOps object maps requests to one or more SPI SearchOps which in turn fulfill the requests using their respective repositories. Among other things, the SearchOps services allows applications and libraries to search for properties and/or values throughout the entire VCR. In one embodiment, searches can be conducted across all Property, Value, BinaryValue, ObjectClass, PropertyChoice and PropertyDefinitions objects in the VCR. Search expressions can include but are not limited to one or more logical expressions, Boolean operators, nested expressions, object names, function calls, mathematical functions, mathematical operators, string operators, image operators, and Structured Query Language (SQL). Table 4 summarizes SearchOps class functionality exposed in the API.

TABLE 4

Exemplary SearchOps Functionality
SearchOps FUNCTIONALITY

Flushes all nodes inside a content cache.
Flushes a specified node from a content cache.
Performs a search with the given search expression.
Updates a content cache's attributes.
Updates a content cache's active state.
Updates a content cache's max entries.
Updates a content cache's time-to-live attribute.

Figure 7:
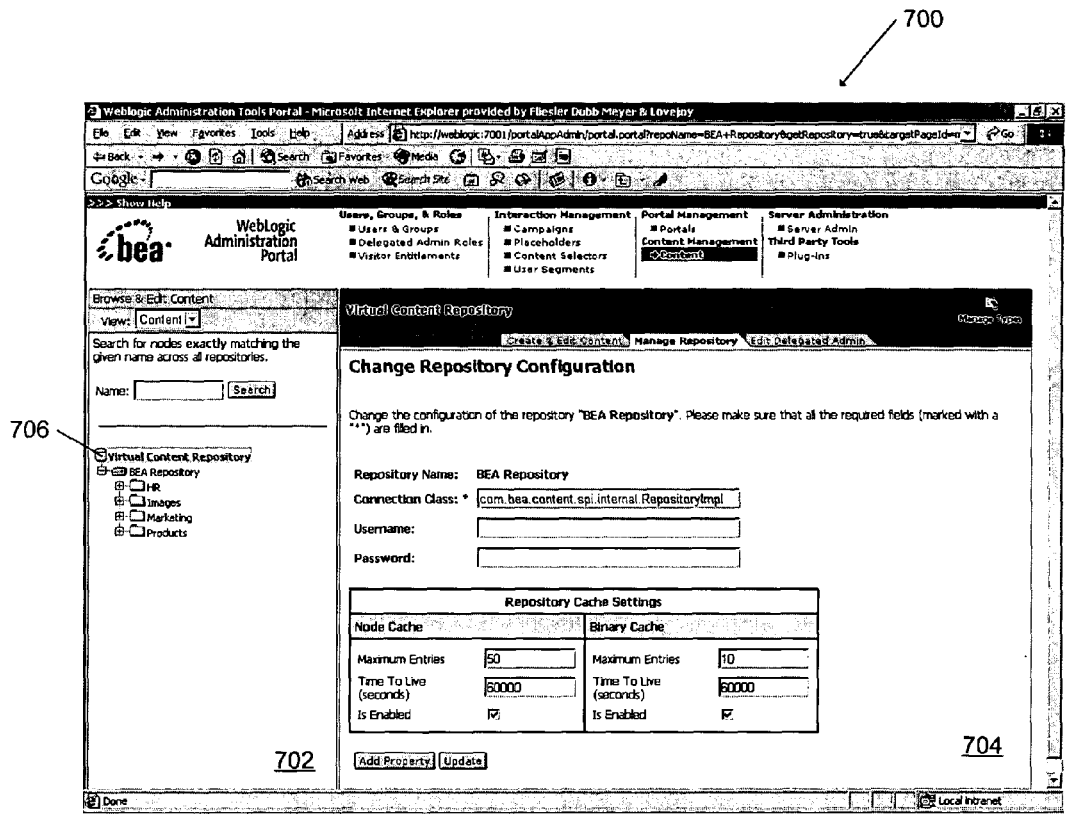
FIG. 7 is an illustration of a virtual content repository browser in one embodiment of the invention.

FIG. 7 is an illustration of a VCR browser in one embodiment of the invention. A VCR browser 700 can include one or more tools built atop the API and has a graphical user interface (GUI). In one embodiment, the browser can be rendered using Microsoft Windows® (available from Microsoft, Corp.). In yet another embodiment, the browser can be implemented as a web portal. Browser window 700 includes a navigation pane 702 and a context-sensitive editor window 704. The navigation pane displays a hierarchical representation of a VCR having one content repository ("BEA Repository") which itself has four hierarchy nodes ("HR", "Images", "Marketing", and "Products"). Selection of a hierarchy node can cause its children to be rendered beneath it in the navigation pane and cause an appropriate editor to be displayed in the editor window. Selection may be accomplished by any means, including but not limited to mouse or keyboard input, voice commands, physical gestures, etc. In this case, the VCR 706 is selected and a repository configuration editor is displayed in the editor window. The editor allows a user to change the configuration parameters (see Table 1) of the VCR. In one embodiment, configuration parameters are manipulated via Java Management Extensions (see FIG. 1).

Figure 8:
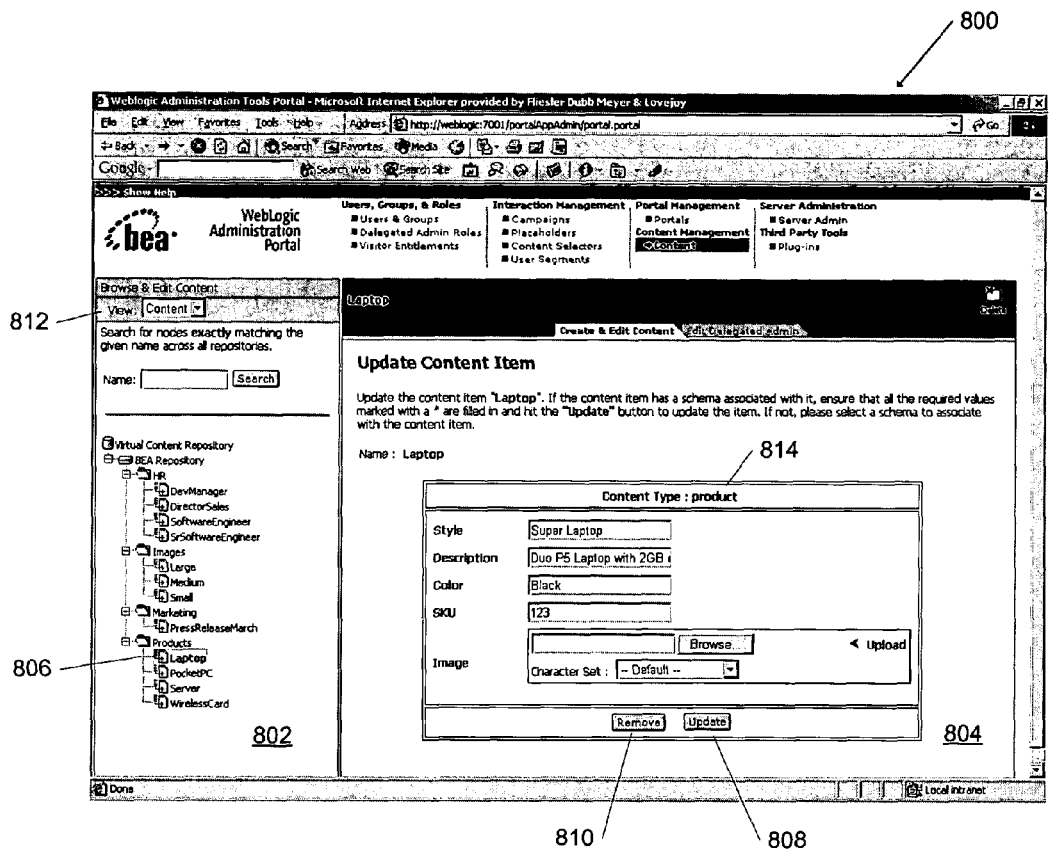
FIG. 8 is an illustration of a content editor in one embodiment of the invention.

FIG. 8 is an illustration of a content editor in one embodiment of the invention. Navigation pane 802 is in "content" mode 812 such that it selectively filters out nodes that define only schemas. Content node 806 ("Laptop") has been selected. Node 806 is a child of hierarchy node "Products", which itself is a child of repository "BEA Repository". Selection of node 806 causes a corresponding content node editor to be rendered in editor window 804. The editor displays the current values for the selected node. The content type 814 indicates that the schema for this node is named "product". In this example, the node has five properties: "Style", "Description", "Color", "SKU" and "Image". A user is allowed to change the value associated with these properties and update the VCR (via the update button 808), or remove the node from the VCR (via the remove button 810).

Figure 9:
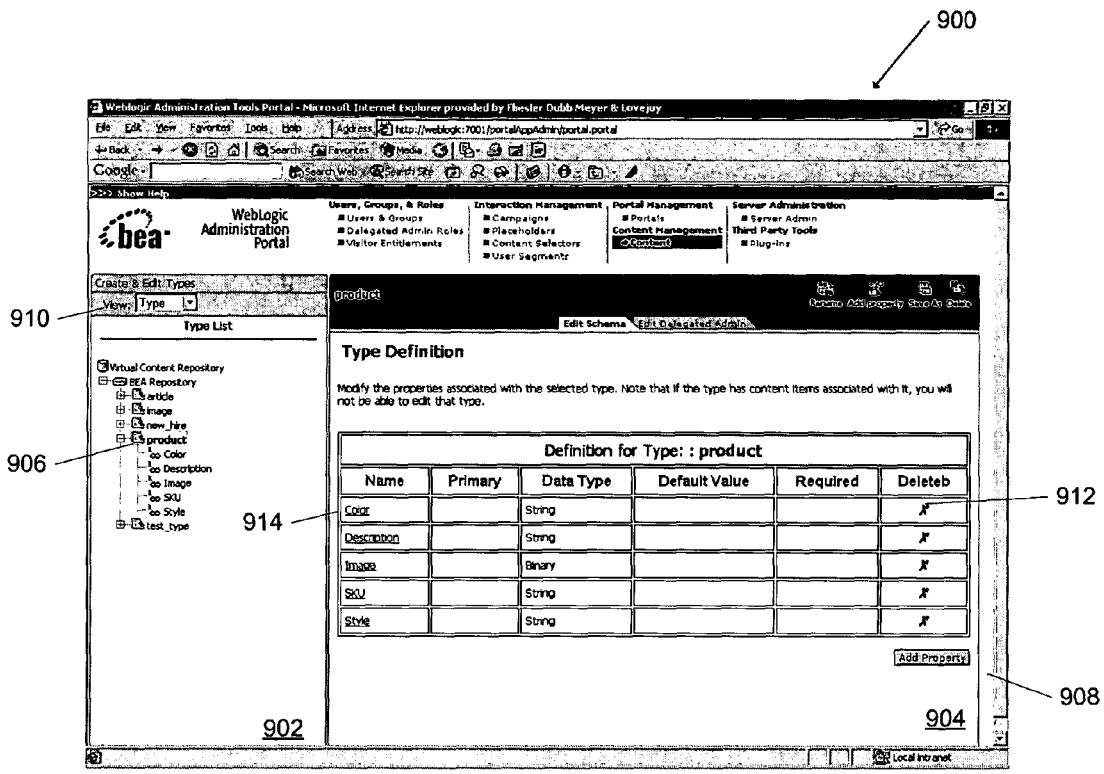
FIG. 9 is an illustration of a schema editor in one embodiment of the invention.

FIG. 9 is an illustration of a schema editor in one embodiment of the invention. Navigation pane 902 is in "type" mode 910 such that it only displays nodes that have schemas but no content. Schema node 906 ("product") has been selected. Node 906 is a child of repository "BEA Repository". Selection of node 906 causes a corresponding schema editor to be rendered in editor window 904. The editor displays the current schema for the selected node (e.g., derived from ObjectClass, PropertyDefinition, PropertyChoice objects). In this example, the node has five property definitions: "Style", "Description", "Color", "SKU" and "Image". For each property, the editor displays an indication of whether it is the primary property, its data type, its default value, and whether it is required. A property can be removed from a schema by selecting the property's delete button 912. A property can be added by selecting the "add property" button 908. A property's attributes can be changed by selecting its name 914 in the editor window or the navigation pane 906 (see FIG. 10).

Figure 10:
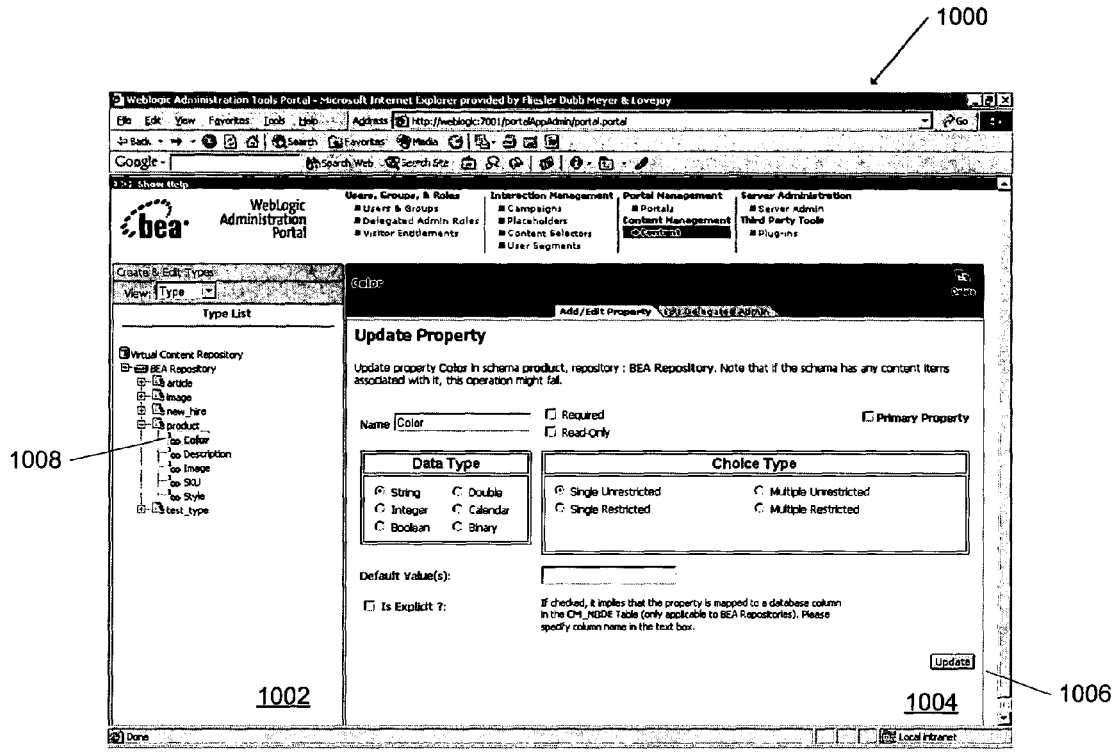
FIG. 10 is an illustration of a property editor in one embodiment of the invention.

FIG. 10 is an illustration of a property editor in one embodiment of the invention. The schema named "product" is being edited. Schema properties definitions are listed beneath their schema name in the navigation pane 1002. Schema property 1008 ("color") has been selected. The editor window 1004 displays the property's current attributes. The name of the attribute (e.g., "color"), whether the attribute is required or not, whether it is read-only, whether it is the primary property, its data type, default value(s), and whether the property is single/multiple restricted/unrestricted can be modified. Changes to the a property's attributes can be saved by selecting the update button 1006.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system including an application program interface (API) embodied on one or more computer readable storage media, comprising:
 a first group of services for integrating a plurality of content repositories into virtual content repositories (VCRs) such that the plurality of content repositories appear and behave as a single content repository, wherein the first group of services include
  first functions for authorizing access to the plurality of content repositories,
  second functions for incorporating combined content of the plurality of content repositories into a hierarchical namespace including representing the plurality of content repositories as a hierarchical namespace of nodes under a single VCR root node,
  third functions for extending a VCR content model to represent information in the plurality of content repositories including sharing a common representation of combined content of the plurality of content repositories as the hierarchical namespace of nodes under a single VCR root node between the API and a content repository service provider interface (SPI) implemented by each of the plurality of content repositories, and
  fourth functions for traversing the hierarchical namespace incorporating combined content of the plurality of content repositories;
 a second group of services for manipulating information in VCRs;
 a third group of services for searching VCRs; and
 a fourth group of services for configuring VCRs;
 wherein the application program interface is compatible with the content repository service provider interface (SPI) that maps operations on the VCR content model to the plurality of content repositories.

2. The system of claim 1 wherein:
 the SPI provides a subset of the services available in the API.

3. The system of claim 1 wherein:
 authorizing access to the plurality of content repositories includes providing authentication information to the plurality of content repositories and receiving authentication results from the plurality of content repositories.

4. The system of claim 1 wherein:
 authorizing access to the plurality of content repositories utilizes Java Authentication and Authorization Service.

5. A distributed computing system embodied on one or more computer readable storage media, comprising:
 a first application configured to execute on one or more processors and to handle requests provided to it by a second application over a network; and
 an application program interface (API) to provide functions used by the first application to access a virtual content repository (VCR), wherein the API includes
  a first group of services for integrating a plurality of content repositories into virtual content repositories (VCRs), wherein the first group of services include
   first functions for authorizing access to the plurality of content repositories,
   second functions for incorporating combined content of the plurality of content repositories into a hierarchical namespace including representing the plurality of content repositories as a hierarchical namespace of nodes under a single VCR root node,
   third functions for extending a VCR content model to represent information in the plurality of content repositories including sharing a common representation of combined content of the plurality of content repositories as the hierarchical namespace of nodes under a single VCR root node between the API and a content repository service provider interface (SPI) implemented by each of the plurality of content repositories, and fourth functions for traversing the hierarchical namespace incorporating combined content of the plurality of content repositories, a second group of services for manipulating information VCRs, a third group of services for searching VCRs, and a fourth group of services for configuring VCRs, wherein the API is compatible with the content repository service provider interface (SPI) that maps operations on the VCR content model to the plurality of content repositories;

wherein the VCR integrates the plurality of content repositories such that the plurality of content repositories appear and behave as a single content repository.

6. The distributed computing system of claim 5 wherein: the SPI provides a subset of the services available in the API.

7. The distributed computing system of claim 5 wherein: authorizing access to the plurality of content repositories includes providing authentication information to the plurality of content repositories and receiving authentication results from the plurality of content repositories.

8. The distributed computing system of claim 5 wherein: authorizing access to the plurality of content repositories utilizes Java Authentication and Authorization Service.

9. A method executing on one or more processors for providing a virtual content repository (VCR) representing a plurality of content repositories embodied on one or more computer readable storage media such that they appear and behave as a single content repository, comprising:

providing a service provider interface (SPI) to be implemented by each of the plurality of content repositories to map operations on a VCR content model to the plurality of content repositories; and providing an application program interface (API), wherein the API includes a first group of services for integrating the plurality of content repositories into the VCR, wherein the first group of services include first functions for authorizing access to the plurality of content repositories, second functions for incorporating combined content of the plurality of content repositories into a hierarchical namespace including representing the plurality of content repositories as a hierarchical namespace of nodes under a single VCR root node, third functions for extending the VCR content model to represent information in the plurality of content repositories including sharing a common representation of combined content of the plurality of content repositories as the hierarchical namespace of nodes under a single VCR root node between the API and the content repository service provider interface, and fourth functions for traversing the hierarchical namespace incorporating combined content of the plurality of content repositories, a second group of services for manipulating information VCRs, a third group of services for searching VCRs, and a fourth group of services for configuring VCRs.

10. The method of claim 9 wherein the content model includes:

a set of hierarchically related objects.

11. The method of claim 9 wherein the namespace makes addressable the content in the plurality of content repositories.

12. The method of claim 9 wherein the API includes:

services for performing operations on the namespace and the content model.

13. The method of claim 9 wherein the SPI includes:

services for merging contents of the plurality of content repositories into the namespace and the content model.

14. The method of claim 9 wherein:

the content repository service provider interface provides a subset of the services available in the application program interface.

15. The method of claim 9 wherein:

authorizing access to the plurality of content repositories includes providing authentication information to the plurality of content repositories and receiving authentication results from the plurality of content repositories.

16. The method of claim 9 wherein:

authorizing access to the plurality of content repositories utilizes Java Authentication and Authorization Service.

17. A computer readable storage medium having instructions stored thereon that when executed by a processor cause a system to:

provide an application program interface (API), wherein the API includes a first group of services for integrating a plurality of content repositories into virtual content repositories (VCR) such that the plurality of content repositories appear and behave as a single content repository, wherein the first group of services include first functions for authorizing access to the plurality of content repositories, second functions for incorporating combined content of the plurality of content repositories into a hierarchical namespace including representing the plurality of content repositories as a hierarchical namespace of nodes under a single VCR root node, third functions for extending a VCR content model to represent information in the plurality of content repositories including sharing a common representation of combined content of the plurality of content repositories as the hierarchical namespace of nodes under a single VCR root node between the API and a content repository service provider interface (SPI) implemented by each of the plurality of content repositories, and fourth functions for traversing the hierarchical namespace incorporating combined content of the plurality of content repositories, a second group of services for manipulating information VCRs, a third group of services for searching VCRs, and a fourth group of services for configuring VCRs;

wherein the SPI maps operations on the VCR content model to the plurality of content repositories.

18. The computer readable storage medium of claim 17 wherein the content model includes:

a set of hierarchically related objects.

19. The computer readable storage medium of claim 17 wherein:
the namespace makes addressable the content in the plurality of content repositories.

20. The computer readable storage medium of claim 17 wherein the API includes:
services for performing operations on the namespace and the content model.

21. The computer readable storage medium of claim 17 wherein the SPI includes:
services for merging contents of the plurality of content repositories into the namespace and the content model.

22. The computer readable storage medium of claim 17 wherein:
the content repository service provider interface provides a subset of the services available in the application program interface.

23. The computer readable storage medium of claim 17 wherein:
authorizing access to the plurality of content repositories includes providing authentication information to repositories and receiving authentication results from the plurality of content repositories.

24. The computer readable storage medium of claim 17 wherein:
authorizing access to the plurality of content repositories utilizes Java Authentication and Authorization Service.

25. An application program interface (API) embodied on one or more computer readable media, comprising:
a first group of services that integrates a plurality of content repositories into virtual content repositories (VCRs) such that the plurality of content repositories appear and behave as a single content repository, wherein the first group of services include
first functions that authorize access to the plurality of content repositories,
second functions that incorporate combined content of the plurality of content repositories into a hierarchical namespace including representing the plurality of content repositories as a hierarchical namespace of nodes under a single VCR root node,
third functions that extend a VCR content model to represent information in the plurality of content repositories including sharing a common representation of combined content of the plurality of content repositories as the hierarchical namespace of nodes under a single VCR root node between the API and a content repository service provider interface (SPI) implemented by each of the plurality of content repositories, and
fourth functions that traverse the hierarchical namespace incorporating combined content of the plurality of content repositories;
a second group of services that manipulates information in VCRs;
a third group of services that searches VCRs; and
a fourth group of services that configures VCRs;
wherein the application program interface is compatible with the content repository service provider interface (SPI) that maps operations on the VCR content model to the plurality of content repositories.

* * * * *

UNITED STATES PATENT AND TRADEMARK OFFICE
CERTIFICATE OF CORRECTION

| | | |
|---|---|---|
| PATENT NO. | : 7,840,614 B2 | Page 1 of 1 |
| APPLICATION NO. | : 10/618494 | |
| DATED | : November 23, 2010 | |
| INVENTOR(S) | : James Owen et al. | |

It is certified that error appears in the above-identified patent and that said Letters Patent is hereby corrected as shown below:

On page 4, in column 1, under "Other Publications", line 40, delete "Desigining" and insert -- Designing --, therefor.

In column 1, line 3, before "CLAIM OF PRIORITY" insert -- COPYRIGHT NOTICE
A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. --.

In column 1, line 12, delete "2003," and insert -- 2003. --, therefor.

In column 1, line 30, before "Jan." insert -- issued --.

In column 2, line 17, delete "NopeOps" and insert -- NodeOps --, therefor.

In column 5, line 39, before "the" delete "an".

In column 7, line 22, delete "NopeOps" and insert -- NodeOps --, therefor.

In column 7, line 31, before "the" delete "a".

In column 7, line 55, delete "Retreive" and insert -- Retrieve --, therefor.

In column 7, line 56, delete "Retreive" and insert -- Retrieve --, therefor.

In column 9, line 22, after "the" delete "a".

Signed and Sealed this
Second Day of August, 2011

David J. Kappos
*Director of the United States Patent and Trademark Office*